United States Patent [19]
Chapman

[11] 3,986,290
[45] Oct. 19, 1976

[54] WEEDLESS FISH HOOK

[76] Inventor: John H. Chapman, 301 Tarrant St., Central, S.C. 29630

[22] Filed: Sept. 26, 1975

[21] Appl. No.: 617,087

[52] U.S. Cl. ............................................. 43/43.6
[51] Int. Cl.² ...................................... A01K 83/00
[58] Field of Search ............... 43/43.6, 42.43, 43.4, 43/43.2

[56] References Cited
UNITED STATES PATENTS

| | | | |
|---|---|---|---|
| 755,677 | 3/1904 | Krus | 43/43.6 |
| 797,281 | 8/1905 | Henzel | 43/43.6 |
| 3,465,466 | 9/1969 | Showalter | 43/43.6 |
| 3,863,383 | 2/1975 | Lore | 43/43.6 |

*Primary Examiner*—Warner H. Camp
*Attorney, Agent, or Firm*—B. P. Fishburne, Jr.

[57] ABSTRACT

A weedless fish hook employs a spring guard having angled contact areas which, when pulled against the interior of the mouth of the fish at the strike, will cause the guard to open with a camming action and expose the fish hook barb for penetration. The guard may have a much stronger tension than was heretofore possible with weedless hooks and there is no necessity for attaching a portion of the line to the guard to assure proper depression or opening of the guard at the moment of the strike.

4 Claims, 5 Drawing Figures

WEEDLESS FISH HOOK

BACKGROUND OF THE INVENTION

Weedless or anti-snagging fish hooks employing spring guards have been known in the prior art for some time, as exemplified by U.S. Pat. Nos. 859,045; 3,221,437; 3,357,125; 3,497,988; and others. A problem relating to weedless hooks which has never been completely solved or satisfactorily solved relates to the choice of the proper degree of spring tension in the guard. The spring tension must be sufficient to resist snagging and if the tension is too light, the guard will open prematurely and allow snagging on weeds or other objects prior to a strike during fishing. On the other hand, if guard tension is excessive, it will effectively prevent snagging but may be too strong to depress or open properly at the moment of strike and thus the fish is not caught. It has been impossible in the prior art to achieve perfect balance in these respects.

One proposed solution to the problem which does work properly is disclosed in the Jester U.S. Pat. No. 3,357,125. In this patent, a part of the fishing line is attached directly to the spring guard so that at the moment of strike the fisherman may jerk the line and assist the guard in opening. Thus, the depressing and opening of the guard in the Jester patent is not wholly dependent on the biting action of the fish. The Jester arrangement allows a guard to be employed with sufficient spring tension to resist premature opening and snagging on weeds and other foreign matter.

However, there is a recognized defect in the Jester approach wherein the fishing line must be attached to the spring guard. The construction is more complicated and there is an additional section of line extending between the hook shank and guard which can be caught or snagged on some object. The principal difficulty, however, with the Jester structure is that the lure will sometimes be pulled against an obstruction on the bottom of a lake and the guard will be opened due to line tension and a hang up will occur, sometimes requiring the entire rig to be severed and a new one installed.

The present invention has for its object to completely solve the above-stated problem or defect in the prior art by a totally new approach and a new mode of operation. The invention allows a much stiffer or stronger spring guard to be employed, and the guard is formed to provide a unique camming action with the mouth of the fish at the moment of strike, and which action can be enhanced by jerking the line at the instant when the strike is noted by the fisherman. By this means, the faithful depression or opening of the guard will occur at the strike without the necessity for attaching the line to the guard in order to assist opening as in the Jester patent. Thus, by a very simple arrangement involving a reshaping of the spring guard, the invention completely satisfies the dilemna heretofore not satisfied in the art, namely, the provision of a sufficiently strong guard to effectively resist snagging, and a guard which will faithfully open when the fish strikes to assure barb exposure and consequently a catch.

Other features and advantages of the invention will become apparent during the course of the following description.

BRIEF DESCRIPTION OF DRAWING FIGURES

DETAILED DESCRIPTION

Figure 1:
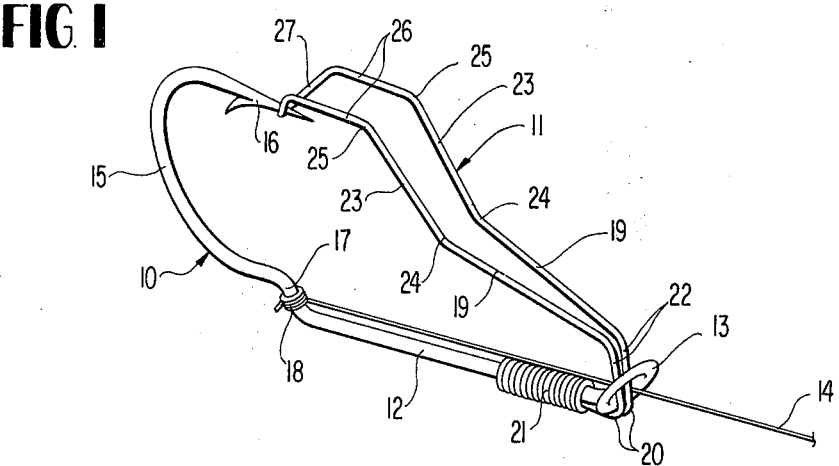
FIG. 1 is a perspective view of a weedless hook and improved guard embodying the invention.

Referring to the drawings in detail wherein like numerals designate like parts, the numeral 10 designates a fish hook having associated therewith a weed guard 11 whose construction forms the principal subject matter of the invention.

The fish hook 10 has a straight shank 12 provided at its rear end with an eye 13 for attachment to a fishing line 14 in some instances. The hook has the usual return bend 15 terminated in a reversely directed barb 16. An abrupt bend or offset 17 is formed in the shank 12 near the bend 15 and serves two main purposes. The bend or offset prevents a plastic worm from sliding down the hook due to continuous casting, as sometimes occurs with weedless hooks. Additionally, the bend 17 provides an alternative location for attaching the line 14, as indicated at 18 in the drawings. When so tied to the bend 17, the force of the strike is behind the barb 16 and drives the point of the hook into the fish rather than pulling it in as where the line is attached to the eye 13. The point or barb can be tilted backward when tied to the eye 13 but will remain in a relatively straight line as it moves forward from the strike with the line tied to the bend 17.

Figure 3:
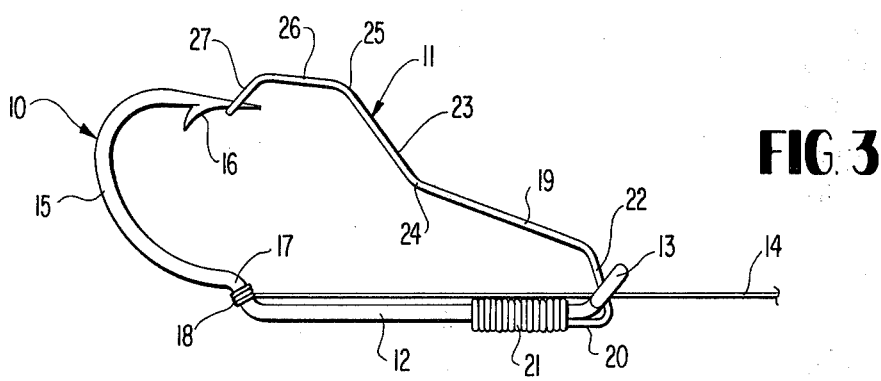
FIG. 3 is a side elevation of the invention.

The spring guard 11 forming the key element of the invention is formed of spring wire and comprises a pair of identical arms 19 whose rearward terminals 20 are firmly secured to the shank 12 near and forwardly of the eye 13 by a binding 21 or other conventional means. Short lateral extensions 22 lead from the terminals 20 and preferably extend through the eye 13 in closely spaced relationship, as shown. The guard arms 19 extend forwardly from extensions 22 in gradually diverging relationship. Near the middle of the spring guard 11, the arms 19 have relatively steeply angled portions 23 including low points 24 and high points or terminals 25. The portions 23 are straight and continue to diverge slightly in the forward direction toward the barb 16. The high points 25 are somewhat above the barb or point as shown in FIGS. 1 and 3.

Figure 2:
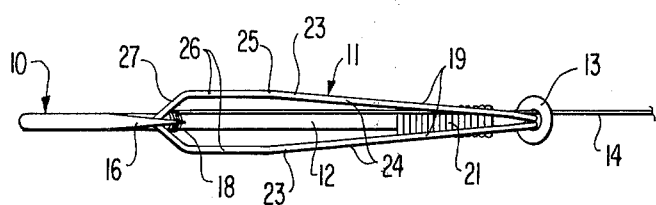
FIG. 2 is a plan view thereof.

From the high points 25 of angled portions 23, the guard further comprises forward approximately parallel extensions 26 which are straight and roughly parallel to the axis of the barb 16. These extensions terminate in a relatively short dependent angled loop or catch 27 whose sides converge toward the barb as shown clearly in FIG. 2. This stirrup-like catch or loop 27 is adapted to engage under the terminal portion of the barb 16 and to be held interlocked with the barb by a predetermined degree of outward spring tension on the guard 11 urging it away from the shank 12. The spring tension in the guard 11 may be considerably greater than in the prior art weed guards, thus rendering the guard 11 much more effective in resisting snagging on weeds and the like, while still allowing a sure catch when the fish strikes, due to a unique camming action through the angled members or portions 23, now to be described. Another feature of the invention is the relatively wider separation of the two arms 19 of the spring guard particularly in the region of the portions 23 and 26, rendering the device more stable and more certain to operate properly when the fish strikes.

Figure 4A:
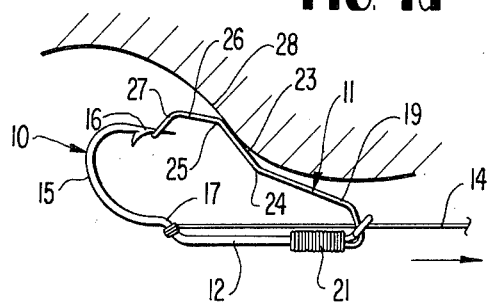
FIGS. 4a and 4b are partly diagrammatic side elevational views showing the operation of the invention at the time of the strike.
Figure 4B:
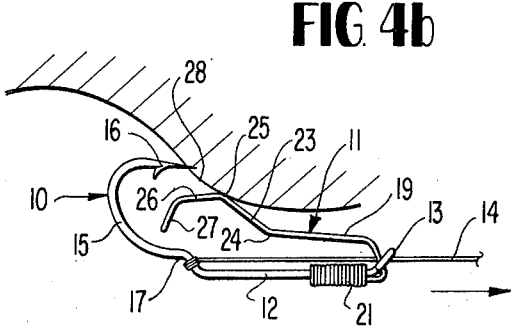

The operation of the invention can be best understood in connection with FIGS. 4a and 4b which show the action of the guard 11 and associated elements at the instant of strike. Prior to strike, the outward spring tension in the guard 11 maintains the catch 27 or loop firmly engaged with the barb 16.

When the fish strikes, the contoured portion 28 of its upper jaw or mouth will engage the angled portions 23 near the low points 24. The instant when the fisherman senses the strike, he should jerk the line 14 in the direction of the arrow, FIG. 4a, and this will drive the angled camming portions 23 against the contoured part 28 of the fish's mouth while driving the barb 16 toward the flesh. The combined action of the fish biting against the spring guard 11 and the tension force applied to the line 14 by the fisherman at this instant will cause the guard 11 to be depressed or to cam open with relation to the barb 16 as the fish's mouth structure 28 rides up on the guard portions 23 toward the high points 25 thereof. Such complete opening of the weedless guard 11 by camming action is clearly shown in FIG. 4b. In this figure, it is also show how the barb 16 is being driven into the flesh of the fish's mouth with the guard 11 depressed, so as to successfully complete the strike. The advantage of attaching the line 14 to the offset or bend 17 of the shank 12 is also apparent in FIG. 4b.

Thus, it is apparent that the invention enables the use of greater tension in the spring weed guard 11 without impeding the faithful opening of the guard when the fish strikes, due to the biting action of the fish and the jerking of the fish line. Both of these actions cause the angled portions 23 of the guard to be cammed downwardly by the upper jaw or contoured mouth portion of the fish, as described. The invention is simple and reliable and it effectively solves a distinct and unpreviously unsolved problem in the prior art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A weedless fish hook comprising in combination a fish hook body having a shank and a reversely directed barb spaced laterally of the shank, a spring guard for the hook attached to the shank and extending laterally and forwardly from the shank toward said barb, said spring guard tensioned away from said shank, said spring guard having a catch element at its forward end adapted to interlock with said barb under said tension of the spring guard, said spring guard having an intermediate angled portion rearwardly of said barb including a high point somewhat above the barb and a low point below the barb, said angled portion forming a cam on the spring guard which responds to the biting action of a fish and fish line tension to force the guard toward said shank and expose the barb for penetration into the mouth of a striking fish, said spring guard further comprising two spaced arms which diverge forwardly and terminate in said catch element, the latter being in the form of a loop attached to said arms, said angled portion comprising a pair of substantially straight intermediate angled sections of said arms and being steeply angled relative to the shank in comparison to the remainder of said spring guard, and a lateral bend in said shank approximately laterally opposite said barb and adapted to have a leading end of a fishing line secured thereto.

2. A weedless fish hook comprising in combination a fish hook body having a shank and a reversely directed barb spaced laterally of the shank, a spring guard for the hook attached to the shank thereof and extending laterally and forwardly from the shank toward said barb, said spring guard tensioned away from said shank, said guard having a catch element at its forward end adapted to interlock with said barb under the tension of said guard, and said guard having an intermediate angled portion rearwardly of the barb including a high point somewhat above the barb and a low point below the barb, said angled portion forming a cam on the guard which responds to the biting action of a fish and fish line tension to force the guard toward said shank and expose said barb for penetration into the mouth of a striking fish, a lateral bend in said shank approximately opposite said barb adapted to have a fishing line attached thereto, and an eye on the rear end of the shank adapted to receive a fishing line.

3. The structure of claim 2, and said spring guard having a rear terminal portion passing through said eye and extending forwardly along the rear portion of the shank, and means for binding said terminal portion to the shank.

4. A weedless fish hook comprising a fish hook body having a shank and a reversely directed barb spaced laterally of the shank, and a spring guard for the hook attached to the shank and being tensioned away from the shank and extending laterally and forwardly from the rear of the shank toward the barb, said guard having a catch element at its forward end adapted to engage under the barb and interlock therewith, said guard having a substantially straight section immediately rearwardly of the catch element and approximately parallel to the shank when the catch element is engaged with the barb, said guard having a steeply inclined substantially straight intermediate section at the rear of said straight section, the lower end of the inclined section disposed near the longitudinal center of said shank and approximately midway between the shank and said barb laterally, and said guard having a rearward straight section joined to the rear end of the steeply inclined section and being inclined to a substantially lesser degree than the steeply inclined section relative to the shank, said rearward section terminating near the rearward end of said shank and having an extension attached directly to the shank.

* * * * *